United States Patent [19]

Hodapp

[11] Patent Number: 4,632,417

[45] Date of Patent: Dec. 30, 1986

[54] BI-FOLD HINGE FOR A FOLDING TOOLBAR

[75] Inventor: Gary D. Hodapp, Mankato, Minn.

[73] Assignee: Hiniker Company, Mankato, Minn.

[21] Appl. No.: 758,102

[22] Filed: Jul. 23, 1985

[51] Int. Cl.[4] .............................................. A01B 73/00

[52] U.S. Cl. .................................. 280/411 C; 16/348; 16/338; 16/367; 172/311

[58] Field of Search ........... 280/411 R, 411 A, 411 C, 280/412; 172/311, 456, 776, 126, 130; 16/366, 348, 349, 337, 338, 367

[56] References Cited

U.S. PATENT DOCUMENTS

| | | | |
|---|---|---|---|
| 3,201,821 | 8/1965 | Ruckstuhl | 16/366 |
| 3,548,954 | 12/1970 | Lindemann | 172/311 |
| 4,147,305 | 4/1979 | Hunt | 172/311 |
| 4,172,537 | 10/1979 | Gandrud et al. | 172/311 X |
| 4,453,601 | 1/1984 | Orthman et al. | 172/311 |

*Primary Examiner*—John A. Pekar

*Attorney, Agent, or Firm*—Emrich & Dithmar

[57] ABSTRACT

A toolbar having a fixed center section and folding wing sections is mounted to and drawn by a tractor. The wings are each connected to the center section by a bi-fold hinge assembly which allows the wing either to fold upwardly for transport or to a forward position. The forward movement is automatically effected in response to the turning of the tractor to allow the toolbar to clear a drawbar-mounted drawn implement positioned aft of the toolbar. A lock pin is placed by the operator in one of two positions to determine the desired mode of operation.

24 Claims, 6 Drawing Figures

BI-FOLD HINGE FOR A FOLDING TOOLBAR

BACKGROUND OF THE INVENTION

This invention relates generally to multi-section toolbars drawn by a tractor such as used in agriculture and is more particularly directed to a bi-fold hinge and control system therefor for use in a folding toolbar.

Multi-section toolbars of the prior art generally include first and second wings pivotally mounted to a main, or center, frame. The wings or "bars" are pivotable between a use position in which the wings are oriented generally horizontally and extend laterally with respect to the main frame and transverse to the direction of travel of the vehicle which draws the toolbar, and a transport or storage position in which the wings extend either rearwardly of the main frame and parallel to the direction of travel of the vehicle or are folded upward so that the width of the entire retracted mechanism is no longer than the length of the main frame. Each of the toolbar wings is coupled to the main frame of the toolbar by means of a hinge mechanism which is aligned either vertically or horizontally to allow the wing to pivot in either one or the other of these directions. Pivoting displacement of the wing sections is generally accomplished by means of the tractor's hydraulic system which is manually controlled by the operator of the vehicle.

With increasing tillage implement size and pulling vehicle power, toolbar length have correspondingly increased. In addition, the numbers and combinations of agricultural tools such as planters, cultivators, fertilizer applicators, etc., arranged in tandem and drawn by the tractor have increased with increasing tractor power. For example, a forward toolbar may be provided with disc gangs to chew up heavy layers of stalks or stubble. These implements may be followed by two or more trailing toolbars upon which may be mounted in tandem various combinations of ridging implements, plow tips, rotary hoes, etc. Where the leading multi-section toolbar is rigidly mounted to an aft portion of the tractor and the trailing toolbars are pivotally coupled to the tractor and are closely positioned aft of the leading toolbar, the maneuverability of the tractor may be restricted. For example, tight turns may be precluded by interference between the leading toolbar and the immediately trailing toolbar or implements mounted thereto. Interference between adjacent toolbars may be avoided by increasing the length of the tongue assembly of the trailing frame, however, the increased length of the overall field cultivator or planter arrangement also restricts the maneuverability of the tractor.

The present invention is intended to solve the aforementioned problems of prior art field cultivators or planters by providing a bi-fold hinge for a folding toolbar which allows the toolbar wings to pivot either vertically upward in a nonuse or storage position or in a forward direction to provide separation between the toolbar wings and closely spaced, trailing implements. The bi-fold hinges positioned on respective ends of a center section of a three-point tractor mounted toolbar allow for automatic forward pivoting displacement of a toolbar wing when the tractor is turned so as to preclude interference between the toolbar wing and trailing implements.

OBJECTS OF THE INVENTION

Accordingly, it is object of the present invention to provide an improved arrangement for pivotally coupling adjacent sections of a multi-section agricultural toolbar.

It is another object of the present invention to provide a hinge arrangement for pivotally coupling adjacent sections of a multi-section toolbar which allows for both horizontal and vertical relative displacement between adjacent toolbar sections.

Yet another object of the present invention is to provide for either the pivoting vertical or horizontal displacement between adjacent sections of a multi-section toolbar under the control of a single hydraulic cylinder.

A further object of the present invention is to provide a bi-fold hinge arrangement for a three-point toolbar mounted to a tractor which allows the tractor to make sharper turns when drawing a trailing drawbar-mounted implement and also permits outer wing sections of the toolbar to be pivotally displaced to an upraised, nonuse position.

A still further object of the present invention is to reduce the turning radius of a tractor having a mounted toolbar and a trailing drawn toolbar of the same width without altering the tongue length of the trailing toolbar frame.

Another object of the present invention is to provide a hinge arrangement for a three-point mounted agricultural toolbar which allows each wing portion of the toolbar frame to be folded horizontally or vertically by means of a a single hydraulic cylinder per hinge.

Still another object of the present invention is to provide for the automatic pivoting horizontal displacement of a wing toolbar about the end of a center toolbar to which it is mounted in response to the turning of a tractor pulling the multi-section toolbar to allow for clearance between the wing toolbar and other equipment drawn by the tractor and positioned aft of the wing toolbar.

The present invention contemplates a bi-fold hinge for use in a three-point folding toolbar mounted to a tractor which also draws a drawbar-mounted toolbar positioned aft of the three-point folding toolbar. The bi-fold hinge pivotally couples either a right or a left outer wing toolbar to a respective end of a center toolbar and permits the outer wing toolbar to pivot either upwardly or forwardly relative to the end of the center toolbar, as desired. When pivoted upwardly, the outer wing toolbar is in the upraised, nonuse position. When the wing toolbar is pivoted in a forward direction, the turning radius of the tractor may be reduced while permitting the three-point mounted toolbar to clear a trailing drawbar-mounted drawn implement without altering the tongue length of the trailing toolbar frame to which the implement is mounted in executing a near square turn while avoiding turning into the drawn implement. An electrically actuated hydraulic control system responsive to a turn executed by the tractor provides for the automatic forward pivoting displacement of the wing toolbar and its re-alignment with the center toolbar upon completion of the turn.

The bi-fold hinge includes an inner hinge assembly mounted to an end of the center toolbar, an outer hinge assembly mounted to an inner end of the outer wing toolbar, and a center hinge assembly. The center hinge assembly is manually coupled by a lock pin either to the inner hinge assembly (which permits the wing to pivot about a vertical axis and move forwardly) or to the outer hinge assembly (which permits the wing to pivot about a horizontal axis and move up to the transport position). When the lock pin couples the inner and center hinge assemblies together, the outer hinge assembly and the wing toolbar are free to move forwardly. This forward movement is powered automatically by a hydraulic cylinder which is actuated in response to the turning of the tractor. When the lock pin couples the center and outer hinge assemblies together, the wing toolbar pivots upwardly in a generally vertical direction by extension of the same hydraulic cylinder. This movement is effected by operator actuation of the cylinder.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1:
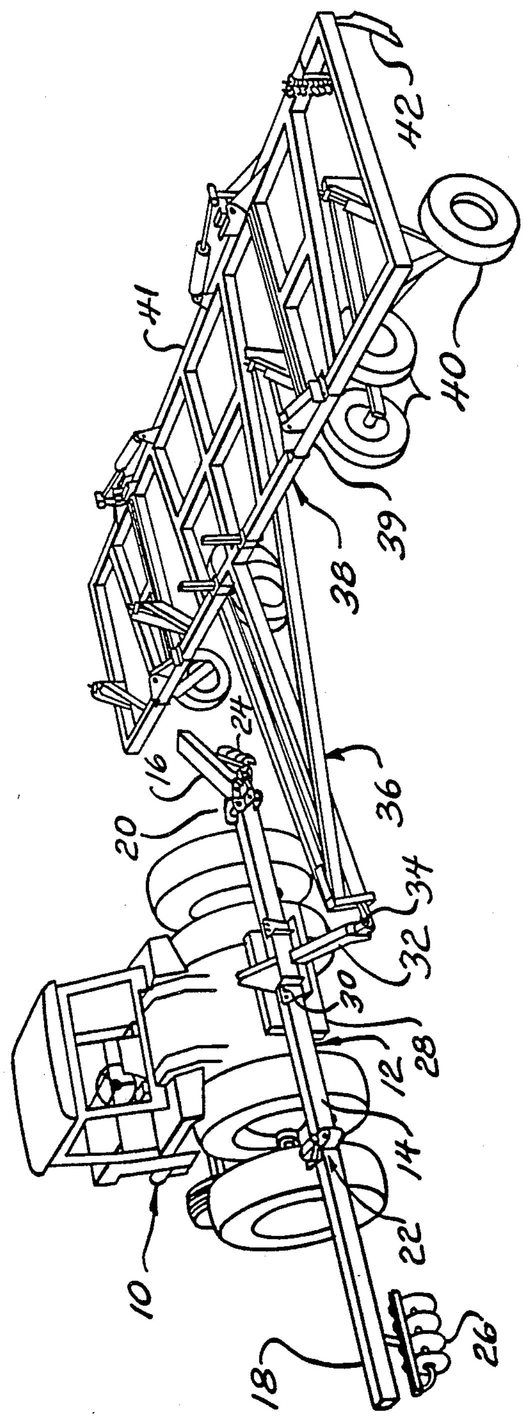
FIG. 1 is a perspective view of a tractor having mounted thereto a three-point folding toolbar having a pair of bi-fold hinges in accordance with the present invention and to which is also coupled a trailing drawbar.

Referring to FIG. 1, there is shown a perspective view of a tractor 10 having mounted to an aft portion thereof a three-point folding toolbar 12. The folding toolbar 12 includes a center toolbar 14, and right and left wing toolbars 16, 18, where the designations right and left are taken with the tractor viewed from the rear. Each of the right and left wing toolbars 16, 18 is pivotally coupled to a respective end of the center toolbar 14 by means of right and left bi-fold hinges 20, 22 in accordance with the present invention. The right and left bi-fold hinges 20, 22 allow the right and left wing toolbars 16, 18, respectively, to pivot either forwardly about a vertical axis as shown for the case of the right wing toolbar 16 in FIG. 1, or to pivot upwardly about a horizontal axis so as to assume a retracted or nonuse position for transport or storage of the three-point mount toolbar 12.

Mounted to the three-point mounted toolbar 12 are any of a number of ground working implements such as cutting colters, disc gangs, ridger implements, etc. As shown in the figure, disc gangs 24 and 26 are respectively mounted to the right and left wing toolbars 16, 18, with the center toolbar 14 adapted to receive a similar disc gang assembly although this is not shown in FIG. 1 for simplicity. Mounted to the center toolbar 14 by means of a plurality of U-bolts 30 is a drawbar 32 extending aft of the three-point mounted toolbar 12. The aft end of the drawbar 32 is provided with a pivoting hitch assembly 34 for receiving and coupling to a forward end portion of the tongue assembly 36 of a main frame 38. The main frame 38 includes a plurality of wheels 40 and toolbars 39 and 41. Forward and aft toolbars 39, 41 generally define the forward and aft portions of the main frame 38, although additional toolbars may be provided for within the main frame or may be attached to an aft portion thereof and drawn thereby. Various combinations of tillage implements may be mounted to the various toolbars in the main frame 38. A plow tip 42 is shown in FIG. 1 mounted to the aft toolbar 41 for illustrative purposes, it being understood that a plurality of such implements would typically be positioned along the length of the aft toolbar 41 and perhaps even upon the forward toolbar 39.

As shown in FIG. 1, the tractor 10 is executing a right-hand turn wherein the combination of the three-point mounted toolbar 14 and the drawbar 32 mounted thereto are pivotally displaced rightwardly relative to the main frame 38. As shown in the figure, the left wing toolbar 18 is aligned along the length of the center toolbar 14, while the right wing toolbar 16 is displaced forwardly relative to the center toolbar. The forward displacement of the right wing toolbar 16 in response to a right-hand turn executed by the tractor 10 prevents interference between the right wing toolbar 16 and the right hand portion of the trailing main frame 38 as well as any implements (not shown) mounted thereto. This is accomplished by means of the bi-fold hinge and control system therefor of the present invention as described in the following paragraphs.

Figure 2:
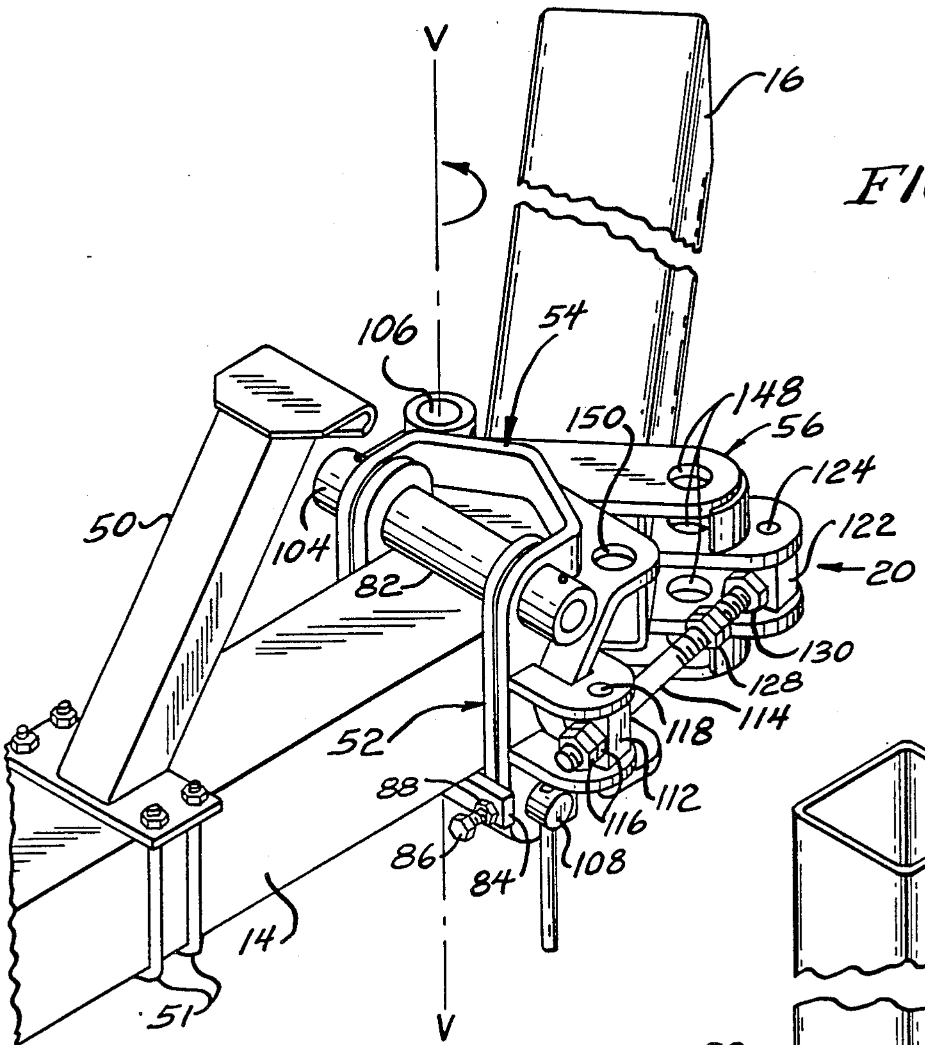
FIG. 2 is a perspective view of a bi-fold hinge in accordance with the present invention showing an outer wing toolbar pivotally displaced in a forward, horizontal direction relative to a center toolbar to which it is coupled.
Figure 3:
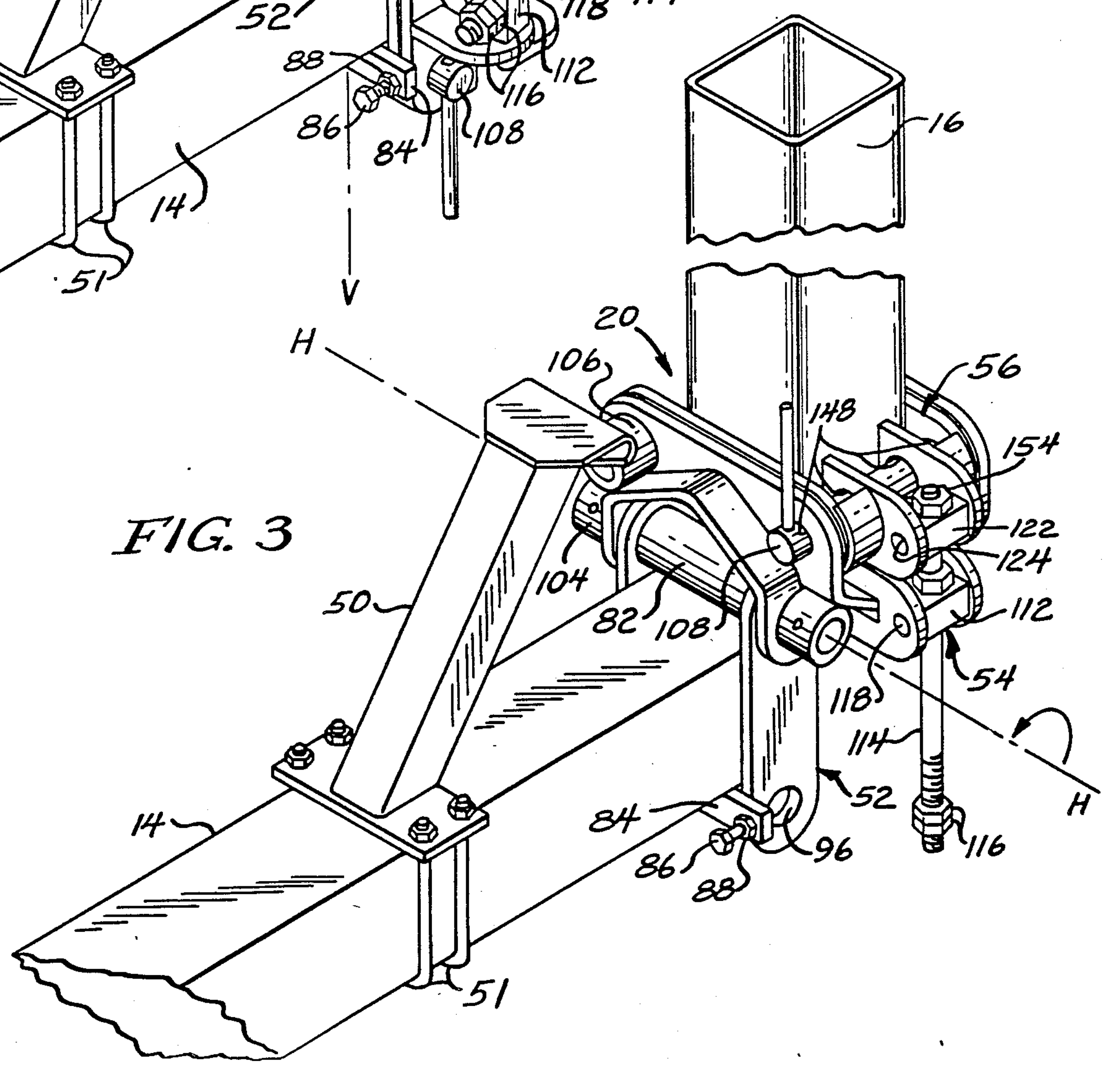
FIG. 3 is an upper perspective view of a bi-fold hinge in accordance with the present invention showing an outer wing toolbar pivotally displaced upward in a generally vertical direction relative to a center toolbar to which it is coupled.

Referring to FIGS. 2 and 3, there are respectively shown perspective views of a bi-fold hinge 20 in accordance with the present invention wherein the right, or outer, wing toolbar 16 is respectively displaced in a forward, horizontal direction and a vertical direction relative to the center toolbar 14 to which it is pivotally coupled. It should be noted that while the configurations of FIGS. 2 and 3 are directed to the coupling between the center toolbar 14 and the right wing toolbar 16, a similar arrangement is provided for in coupling the center toolbar to a left wing toolbar. Therefore, the right wing toolbar will henceforth be referred to as an outer wing toolbar for simplicity. Additional details of the bi-fold hinge 20 are shown in the exploded, partially cutaway, perspective view of FIG. 4.

The center and outer wing toolbars 14, 16 are of a generally square, tubular configuration and are comprised of a high strength steel. Securely attached to an end portion of the center toolbar 14 is an inner hinge assembly 52. The inner hinge assembly 52 includes a mounting bracket 82 having upper and lower pairs of horizontally aligned apertures 94, 96 (with only one aperture of each pair shown in FIG. 4). The coupling bracket 82 may be mounted to the end of the center toolbar 14 by conventional means such as by welding.

Figure 4:
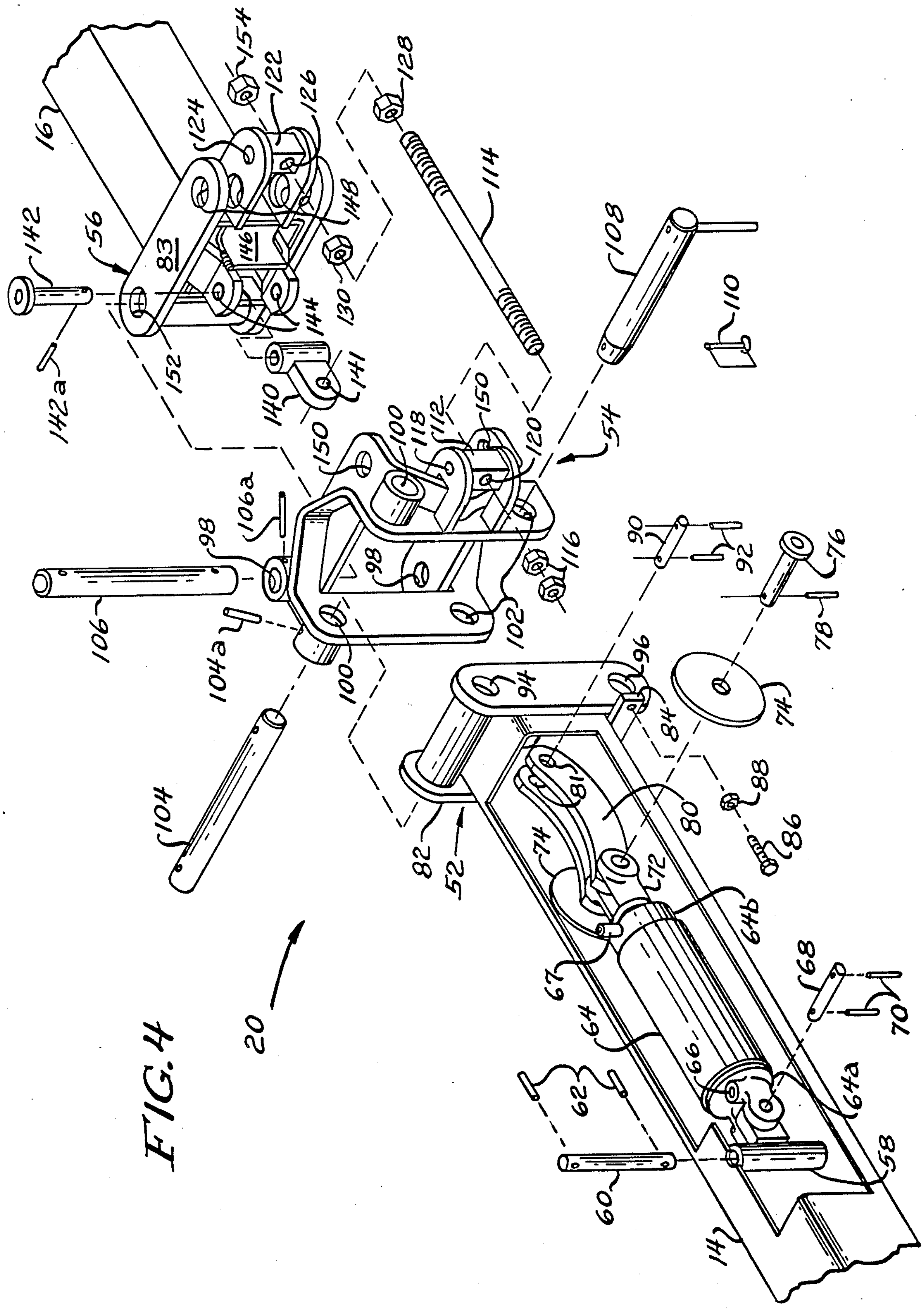
FIG. 4 is an exploded, partially cutaway, perspective view of the bi-fold hing assembly of the present invention.

Mounted to the inner end of the outer wing toolbar 16 by conventional means such as welding is an outer hinge assembly 56 which includes a coupling bracket 83. The coupling bracket 83 includes first and second sets of vertically aligned apertures 148 and 152, where only the upper aperture of the second set of apertures 152 is shown in FIG. 4. A first trunnion block 122 is mounted to a lateral portion of the coupling bracket 83 by means of upper and lower pivot pins 124, with only the upper pivot pin shown in the figure, and is freely rotatable therein. The first trunnion block 122 is provided with a generally horizontally aligned aperture 126 therein. A pair of reinforcing members 146 are connected to a center portion of the coupling bracket 83 and to the inner end of the outer wing toolbar 16 for increased strength in the connection therebetween. A pair of generally vertically aligned apertures 144 are provided for in the aforementioned center portion of the coupling bracket 83. A cylinder pull weld 140 is adapted for positioning in the center portion of the coupling bracket 83 between the aligned apertures 144 and is maintained in position therebetween by means of a coupling pin 142 which, in turn, is maintained in position by means of a retaining pin 142*a*.

A center hinge assembly 54 is positioned between the aforementioned inner and outer hinge assemblies 52, 56 and includes various combinations of apertures therein for coupling it either in a pivoting or a fixed manner to both the inner and outer hinge assemblies as described below. The center hinge assembly 54 includes upper and lower horizontally aligned pairs of apertures 100, 102 in an inner portion thereof. With the upper horizontally aligned apertures 100 of the center hinge assembly 54 aligned with the upper paired apertures 94 of the coupling bracket 82, the inner and center hinge assemblies 52, 54 may be coupled together by inserting a horizontal pivot pin 104 through the aforementioned apertures. Similarly, the center hinge assembly 54 includes a pair of vertically spaced, aligned apertures 98 which are adapted for positioning outside of and in alignment with the second vertically aligned apertures 152 of the coupling bracket 83. Insertion of a vertical pivot pin 106 in the paired apertures 98 and 152 when aligned permits the center hinge assembly 54 to be pivotally coupled to the outer hinge assembly 56. The horizontal pivot pin 104 and the vertical pivot pin 106 are maintained in position by respective pairs of retaining pins 104*a* and 106*a*.

Positioned within and aligned along the length of the center toolbar 14 adjacent the end thereof is a hydraulic cylinder 64. The hydraulic cylinder 64 includes a butt end 64*a* and a rod end 64*b*. The butt end 64*a* of the hydraulic cylinder 64 is securely coupled to a mounting bracket 58 by means of a hinge pin 68 maintained in position by a pair of retaining pins 70. The mounting bracket 58 is, in turn, mounted to and maintained in position within the center toolbar 14 by means of a mounting pin 60 which is maintained in position on the toolbar by means of a pair of retaining pins 62. The butt end 64*a* of the hydraulic cylinder 64 is thus securely mounted in a stationary manner within the center toolbar 14. The butt end 64*a* and the rod end 64*b* of the hydraulic cylinder 64 include respective hydraulic couplings 66, 67 by means of which the hydraulic cylinder may be coupled to a hydraulic system which includes a reservoir (not shown) and by means of which the hydraulic cylinder is thus "double acting".

The rod end 64*b* of the hydraulic cylinder 64 is coupled to the combination of a pair of rollers 74 and a control link 80 by means of a coupling pin 76 which is maintained in position by means of a retaining pin 78 inserted therethrough. The control link 80 extends through an aperture in the center hinge assembly 54 with its outer end provided with a pair of aligned apertures 81 which are adapted for positioning about and in alignment with an aperture 141 in the cylinder pull weld 140. With the apertures 81 and 141 thus aligned, a hinge pin 90 is inserted through the control link 80 and cylinder pull weld 140 for coupling these elements of the bi-fold hinge. The hinge pin 90 is maintained in position by means of a pair of retaining pins 92. Linear displacement of the control link 80 within the center toolbar 14 upon the extension and retraction of the rod end 64*b* of the hydraulic cylinder 64 is facilitated by the pair of rollers 74 which engage a lower, inner surface of the center toolbar and are free to rotate in response to the extension and retraction of the hydraulic cylinder. Whether the combination of the outer hinge assembly 56 and outer wing toolbar 16 pivots vertically about the horizontal pivot pin 104 or horizontally about the vertical pivot pin 106 upon extension of the hydraulic cylinder 64 is determined by the position of a lock pin 108 within the bi-fold hinge assembly 20 as described in the following paragraphs.

The center hinge assembly 54 is further provided with a lower horizontally aligned pair of apertures 102 on an inner portion thereof. Similarly, a pair of aft vertically aligned apertures 150 is provided in the center hinge assembly 54. With the outer wing toolbar 16 aligned along the length of the center toolbar 14, the lower horizontal aligned apertures 102 of the center hinge assembly 54 are aligned with the lower apertures 96 of the inner hinge assembly 52. In addition, with the center and outer wing toolbars thus in linear alignment, the aft vertically aligned apertures 150 in the center hinge assembly 54 are in alignment with the first vertically aligned apertures 148 in the outer hinge assembly 56. By positioning the lock pin 108 within the aligned apertures 102 and 96, the inner and center hinge assemblies 52, 54 are rigidly coupled together, while the outer hinge assembly 56 is free to pivot relative to the center hinge assembly 54 about the vertical pivot pin 106. Thus, extension of the hydraulic cylinder 64, which is coupled to the outer hinge assembly 56 by means of coupling bracket 72, control link 80, and cylinder pull weld 140 as described above, will result in the generally horizontal pivoting displacement of the combination of the outer hinge assembly 56 and the outer wing toolbar 16 in a forward direction about the vertical pivot pin 106 as shown in FIG. 2. This pivoting displacement is facilitated by the pivoting coupling between the cylinder pull weld 140 and the coupling bracket 83.

With the lock pin 108 inserted in the vertically aligned apertures 150 and 148 of the center and outer hinge assemblies 54, 56, these hinge assemblies are rigidly coupled together. With the lock pin 108 thus removed from the horizontally aligned apertures 96 and 102, the combination of the center hinge assembly 54, the outer hinge assembly 56, and the outer wing toolbar 16 coupled thereto is free to pivot upon the extension of the hydraulic cylinder 64 about the horizontal pivot pin 104 in a generally vertical direction as shown in FIG. 3. In the configuration shown in FIG. 2, the outer wing toolbar 16 is horizontally displaced forward of the center toolbar 14 in order to avoid interference between the outer wing toolbar and a trailing toolbar and implements mounted thereto as shown in FIG. 1. In the configuration shown in FIG. 3, the outer toolbar 16 has been pivotally displaced upward in a generally vertical direction about the end of the center toolbar 14 wherein the outer wing toolbar assumes a nonuse position for transport or storage. To facilitate upward displacement of the outer wing toolbar 16, the control link 80 is free to pivot about the coupling pin 76 which pivotally connects the control link to the ram end 64*b* of the hydraulic cylinder 64. A wing stand assembly 50 may be securely mounted to the center toolbar 14 by means of a plurality of U-bolts 51 in order to provide support for the outer wing toolbar 16 when in the upraised, retracted position. The lock pin 108 is maintained in position by means of a snap ring 110 inserted through one end thereof.

A second trunnion block 112 is adapted for positioning on an aft portion of the center hinge assembly 54 and is maintained in position by means of a pair of pivot pins 118 (only one of which is shown in the various figures). The second trunnion block 112 is provided with an aperture 120 therein which is adapted to receive one end of a rod 114. The other end of the rod 114 is adapted for positioning within the aperture 126 in the first trunnion block 122 which is pivotally mounted to the coupling bracket 83 of the outer hinge assembly 56. The ends of the rod 114 are provided with threaded portions for the positioning of various arrangements of nuts thereon. The spacing of these nuts, as described below, provides for the selective adjustment of various relative positions between the center toolbar 14 and the outer wing toolbar 16.

A pair of jam nuts 116 are positioned on the threaded inner end of the rod 114 inwardly from the second trunnion block 112 through which the rod is inserted and which is free to slide along the length of the rod. Positioned on respective sides of the first trunnion block 122 along the outer threaded end portion of the rod 114 are jam nuts 130 and 154. The jam nuts 130, 154 are positioned on opposite sides of the first trunnion block 122 in closely spaced relation so as to lock the rod 114 within the first trunnion block 122 and to prevent its sliding therein. The first trunnion block 122 is thus fixedly positioned along the length of the rod 114, while the second trunnion block 112 is free to slide along the length of the rod. Alternately, rod 114 may be secured to trunnion block 112 and slide within block 122 using the same nuts. A lock nut 128 is positioned on the outer threaded end portion of the rod 114, inwardly spaced from the combination of the first trunnion block 122 and jam nuts 130, 154 positioned adjacent thereto. The position of the jam nuts 116 along the length of the inner threaded portion of the rod 114 determines how far the outer wing toolbar 16 folds forward when the hydraulic cylinder 64 is extended with the locking pin 108 inserted in the horizontally aligned apertures 96 and 102. In a preferred embodiment, the forward angular displacement of the outer wing toolbar is limited to 40° maximum. The position of the lock nut 128 along the outer threaded end portion of the rod 114 controls the rearward position of the outer wing toolbar 16 or straightness of the combination of the center toolbar 14 and outer wing toolbar 16 when in the extended, working position. Finally, the combination of a bracket 84 mounted to the coupling bracket 82 and an adjusting bolt 86 and lock nut 88 permits the downward stop of the outer wing toolbar 16 to be adjusted as desired by engaging the center hinge assembly 54 when the outer wing toolbar is lowered.

Figure 5:
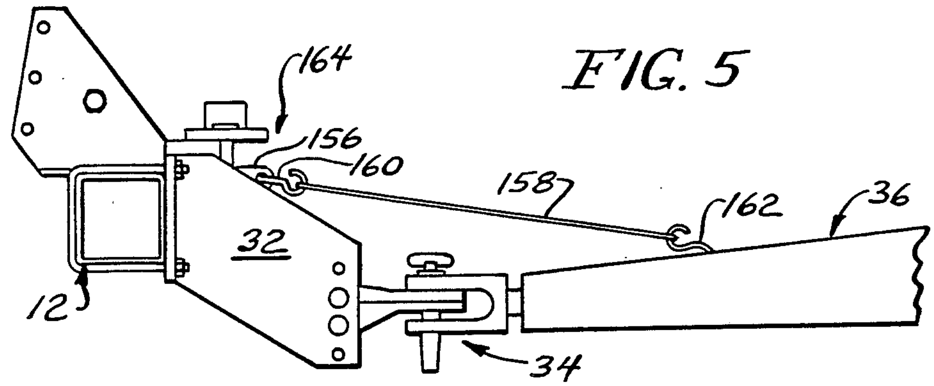
FIG. 5 is a side view showing the coupling between the bi-fold hinge assembly of the present invention and the tongue assembly of a drawbar-mounted frame drawn aft of a three-point folding toolbar incorporating the bi-fold hinge of the present invention.

Referring to FIG. 5, there is shown a side view illustrating the coupling between a control system 164 for controlling the operation of the bi-fold hinge assembly of the present invention and a frame drawn aft of the toolbar 12. The control system 164 is mounted to a drawbar 32 attached to the three-point mounted toolbar 12. The control system 164 includes a cam switch assembly 156 coupled by means of a first retention clip 160 to one end of an actuator strap 158. The other, or aft, end of the actuator strap 158 is coupled to the tongue assembly 36 of the frame (not shown) being drawn by the tractor. The tongue assembly 36 is pivotally coupled to the drawbar 32 by means of a conventional pivoting hitch assembly 34. The actuator strap 158 provides directional information to the cam switch assembly 156 relating to a turn executed by the tractor as determined by the position of the tongue assembly 36 relative to the drawbar 32 for automatically controlling the forwarding pivoting displacement of either the right or the left outer wing toolbar as described in the following paragraphs.

Figure 6:
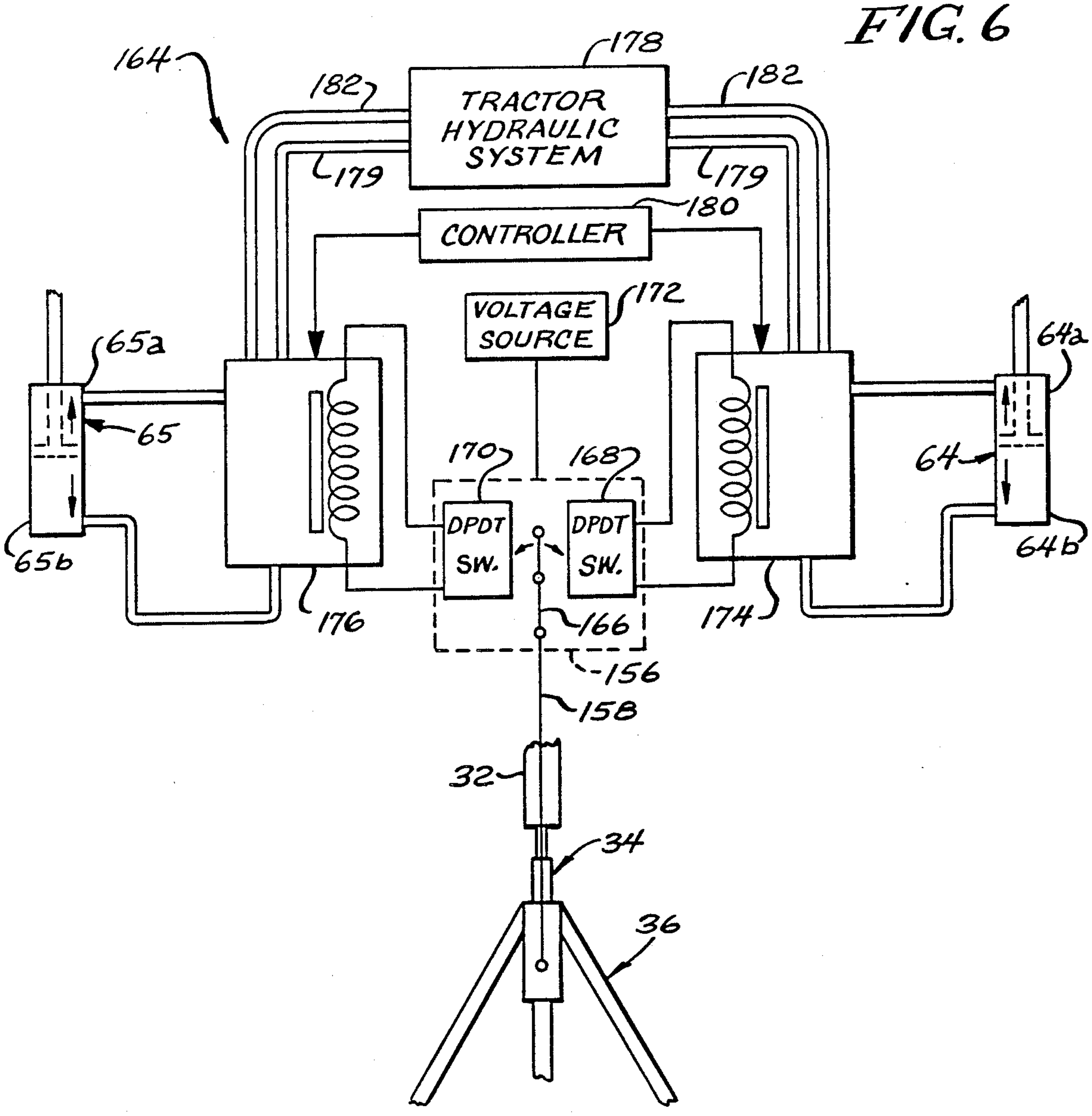
FIG. 6 is a simplified schematic diagram of a combined electrical and hydraulic control system for controlling a bi-fold hinge in accordance with the principles of the present invention.

Referring to FIG. 6, there is shown a simplified schematic diagram of the combined electrical and hydraulic control system 164 for controlling a bi-fold hinge assembly in accordance with the principles of the present invention. As previously described with respect to FIG. 5, an aft end of the actuator strap 158, which preferably is comprised of rubber, is securely coupled to the tongue assembly 36 of the drawn frame. The forward end of the actuator strap 158 is coupled to an actuating lever 166 within the cam switch assembly 156. The cam switch assembly 156 includes first and second double-pole, double-throw switches 168 and 170 which in turn are coupled to solenoids 174 and 176, respectively. Switch 168 is actuated upon a right-hand turn of the tractor and energizes solenoid 174 which couples the tractor's hydraulic system 178 via pressure line 182 to the butt end of the right hydraulic cylinder 64 and causes hydraulic fluid to extend the piston arm in pivoting the right wing toolbar 16 about a vertical axis and causing it to swing in a forward direction. Fluid is returned to the tractor's hydraulic system via line 179. When the tractor completes the turn and the tongue assembly 36 is positioned directly aft of the cam switch assembly 156, switch 168 switches and reverses polarity of the voltage source 172 to the winding of solenoid 174, thereby retracting cylinder 64 which pivotally displaces the right wing toolbar 16 rearwardly so as to align it along the length of the center toolbar 14. When the cylinder is fully retracted, a limit switch (not shown) is engaged by the collar of the rod to shut off the solenoid, as is well known in this art, and the oil simply free cycles. This permits the operator to manually activate the cylinder by means of a manual controller 180 when it is desired to raise one or both of the wings for transport.

Similarly, in response to a left-hand turn of the tractor, the actuating lever 166 will actuate the second double-pole, double-throw switch 170 to energize the left solenoid 176 by means of the voltage source 172 to extend cylinder 65 and move the left wing toolbar 18 forward.

It is in this manner that the right and left wing toolbars 16, 18 are automatically pivotally displaced in a forward direction in response respectively to a right hand or left hand turn executed by the tractor to which the three-point mounted toolbar 12 is connected. Conventional hydraulic control means 180 responsive to tractor operator inputs is coupled to the right and left solenoids 174, 176 to permit the right and left wing toolbars 16, 18 to be raised to the nonuse position and to be lowered to the use position.

There has thus been shown a bi-fold hinge and control system therefor for use in a folding toolbar which permits the winged portions of the toolbar to be either pivotally displaced in a generally vertical direction to an upraised, nonuse position or to be automatically displaced in a forward direction in response to a turn executed by a tractor to which the folding toolbar is mounted. The automatic forward pivoting displacement of an outer wing toolbar in response to the turning of the tractor prevents interference between the outer wing toolbar and a trailing toolbar, or implements mounted thereto, drawn by the tractor.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. For use in a folding toolbar mounted to a traction vehicle pulling a drawn toolbar aft of said folding toolbar, said folding toolbar including a center toolbar and an outer wing toolbar, a bi-fold hinge for pivotally coupling said center and outer wing toolbars comprising:

- an inner hinge assembly securely mounted to an end of the center toolbar;
- an outer hinge assembly securely mounted to an end of the outer wing toolbar;
- a center hinge assembly pivotally coupled to said inner and outer hinge assemblies;
- locking means for engaging and rigidly coupling said inner and center hinge assemblies wherein the combination of said outer hinge assembly and the outer wing toolbar mounted thereto are free to pivot about the end of the center toolbar in a first direction, or for engaging and rigidly coupling said center and outer hinge assemblies wherein the combination of said center and outer hinge assemblies and the outer wing toolbar mounted thereto is free to pivot about the end of the center toolbar in a second direction, wherein said first and second directions are generally transverse; and
- single displacement means coupled to said center toolbar and to the bi-fold hinge for pivotally displacing said outer toolbar in said first direction when said locking means engages said inner and center hinge assemblies or in said second direction when said locking means engages said center and outer hinge assemblies.

2. The bi-fold hinge of claim 1 wherein said locking means includes alignment means for orienting said first direction generally horizontal and said second direction generally vertical.

3. The bi-fold hinge of claim 2 wherein said alignment means includes forward guide means for displacing the outer wing toolbar forward of the center toolbar when pivotally displaced in a generally horizontal direction about the end of the center toolbar.

4. The bi-fold hinge of claim 3 further including first adjustment means coupled between said center and outer hinge assemblies for establishing as desired a forward displacement limit of the outer wing toolbar.

5. The bi-fold hinge of claim 4 further including second adjustment means coupled between said center and outer hinge assemblies for establishing as desired an aft displacement limit of the outer wing toolbar.

6. The bi-fold hinge of claim 5 wherein said first and second adjustment means include a threaded rod and a plurality of spaced lock nuts thereon, wherein said rod is coupled between said center and outer hinge assemblies and wherein the spacing of said plurality of lock nuts on said threaded rod determines the forward and aft positions of the outer wing toolbar.

7. The bi-fold hinge of claim 5 further including third adjustment means coupled between the center toolbar and said center hinge assembly for establishing as desired the relative vertical angle between the center and outer wing toolbars when the outer wing toolbar is in a lowered position.

8. The bi-fold hinge of claim 1 further including a first pivot pin pivotally coupling said inner and center hinge assemblies and a second pivot pin pivotally coupling said outer and center hinge assemblies.

9. The bi-fold hinge of claim 8 wherein said first pivot pin is oriented generally horizontally and said second pivot pin is oriented generally vertically and wherein said locking means comprises a lock pin.

10. The bi-fold hinge of claim 1 wherein said first direction is generally horizontal, forward of the center toolbar and said second direction is generally vertical, upward from the center toolbar, said bi-fold hinge further including a control system including said single displacement means for automatically displacing the outer wing toolbar in said first direction in response to a turn executed by the traction vehicle toward the outer wing toolbar.

11. The bi-fold hinge of claim 10 wherein said control system further includes a manual controller for pivotally displacing said center and outer hinge assemblies and the outer wing toolbar in said second direction for positioning the outer wing toolbar in an upraised, retracted position.

12. The bi-fold hinge of claim 11 wherein said control system is an electrically actuated hydraulic control system and said single displacement means includes a hydraulic cylinder and wherein the outer wing toolbar is pivotally displaced in response to the extension of said hydraulic cylinder.

13. The bi-fold hinge of claim 12 wherein said hydraulic cylinder is positioned within the center toolbar and is aligned along the length thereof and includes a butt end mounted to the center toolbar and a ram end coupled to the outer hinge assembly.

14. The bi-fold hinge of claim 13 wherein said hydraulic cylinder is double acting for pivotally displacing the outer wing toolbar in said first or second directions when extended and for aligning the outer wing toolbar generally along the length of the center toolbar when retracted.

15. The bi-fold hinge of claim 14 wherein said control system further includes a solenoid coupled to a hydraulic reservoir and to said hydraulic cylinder for controlling the flow of hydraulic fluid therein.

16. The bi-fold hinge of claim 15 wherein said control system further includes an electric switch means responsive to the turning of the traction vehicle for automatically controlling the operation of said solenoid and the flow of hydraulic fluid within said hydraulic cylinder.

17. The bi-fold hinge of claim 16 wherein the drawn toolbar is mounted to a frame pivotally coupled to and drawn aft of the folding toolbar and wherein said electric switch means includes in combination a pivoting actuating lever and an elongated coupling member connecting said actuating lever to said frame for pivotally displacing said actuating lever in the direction of a turn executed by said traction vehicle for extending said hydraulic cylinder when the traction vehicle turns toward the outer wing toolbar.

18. The bi-fold hinge of claim 17 wherein said coupling member comprises a rubber strap.

19. The bi-fold hinge of claim 18 wherein said frame includes a tongue assembly pivotally coupled to the center toolbar and wherein an aft end of said rubber strap is coupled to said tongue assembly and a forward end of said rubber strap is coupled to said pivoting actuating lever.

20. In an agricultural implement adapted to be drawn behind a traction vehicle and including a forward toolbar for carrying tools and having a fixed center bar and outer wing bars, the improvement comprising:

a hinge assembly connecting said wing bars to the outboard ends of said center bar respectively and including a fixed hinge pin defining a vertical pivot axis located forwardly of the center line of said fixed center bar for permitting the associated wing bar to move forwardly;

a hydraulic cylinder connected at one end to said center bar and at the other end to the associated outer wing bar; and means responsive to the turning of the traction vehicle for actuating the hydraulic cylinder associated with the side to which the traction vehicle is turning for pivoting the associated wing bar assembly.

21. The apparatus of claim 20 wherein said center bar is tubular and said hydraulic cylinder is positioned within and aligned along the length of said center bar.

22. The apparatus of claim 21 wherein said hydraulic cylinder includes a butt end and a ram end and wherein said butt end is securely mounted to said center bar and said ram end is coupled to said outer wing bar.

23. The apparatus of claim 20 wherein said hydraulic cylinder is double-acting for pivoting the associated wing bar rearwardly upon receipt of a control input from said means responsive to the turning of the traction vehicle upon completion of a turn by the traction vehicle.

24. The apparatus of claim 23 wherein extension of said hydraulic cylinder pivots the outer wing bar forwardly and retraction of said hydraulic cylinder pivots the outer wing bar rearwardly so as to align the outer wing bar generally along the length of the fixed center bar.

* * * * *